United States Patent
Dudar

(10) Patent No.: US 12,221,935 B2
(45) Date of Patent: Feb. 11, 2025

(54) SYSTEMS AND METHODS FOR PURGING AIR INTAKE SYSTEM HYDROCARBON TRAP OF HYBRID VEHICLE

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/331,018

(22) Filed: Jun. 7, 2023

(65) Prior Publication Data
US 2024/0410324 A1 Dec. 12, 2024

(51) Int. Cl.
- *F02D 41/00* (2006.01)
- *B60W 20/15* (2016.01)
- *F02M 25/08* (2006.01)

(52) U.S. Cl.
CPC .......... *F02D 41/004* (2013.01); *B60W 20/15* (2016.01); *F02M 25/0836* (2013.01); *F02M 25/0854* (2013.01); *F02M 2025/0881* (2013.01)

(58) Field of Classification Search
CPC .. F02D 41/004; B60W 20/15; F02M 25/0836; F02M 25/0854; F02M 2025/0881
See application file for complete search history.

(56) References Cited

U.S. PATENT DOCUMENTS

| | | | |
|---|---|---|---|
| 9,163,571 B2 | 10/2015 | Dudar et al. | |
| 9,376,969 B2 | 6/2016 | Yang et al. | |
| 9,790,874 B2 | 10/2017 | Dudar | |
| 2015/0120110 A1* | 4/2015 | Yang | F02D 41/0032 903/903 |
| 2017/0204796 A1* | 7/2017 | Dudar | F02M 25/089 |

OTHER PUBLICATIONS

Halvorson, B. et al., "California plan: 80% EVs by 2035, 50-mile plug-in hybrids, tighter tailpipe emissions," Green Car Reports Website, Available Online at https://www.greencarreports.com/news/1132190_california-plan-80-fully-electric-by-2035-50-mile-plug-in-hybrids-tighter-tailpipe-emissions, May 7, 2021, 25 pages.

\* cited by examiner

*Primary Examiner* — Xiao En Mo
(74) *Attorney, Agent, or Firm* — Vincent Mastrogiacomo; McCoy Russell LLP

(57) ABSTRACT

Methods and systems are provided for deep purging of fuel vapors of an air intake system hydrocarbon trap. The purging may comprise supplying heated air to the air intake system hydrocarbon trap via a carbon filled fuel vapor storage canister that includes an integral heater. The heated air operates to liberate heavier hydrocarbons from the air intake system hydrocarbon trap.

16 Claims, 5 Drawing Sheets

SYSTEMS AND METHODS FOR PURGING AIR INTAKE SYSTEM HYDROCARBON TRAP OF HYBRID VEHICLE

FIELD

The present description relates generally to methods and systems for purging hydrocarbons from an air intake system hydrocarbon trap of a hybrid vehicle.

BACKGROUND/SUMMARY

A hybrid vehicle may include an internal combustion engine and an electric machine that operate as propulsion sources. The hybrid vehicle may include a traction battery that allows the electric machine to propel the hybrid vehicle for an extended distance (e.g., greater than 60 kilometers). The traction battery may allow the hybrid vehicle's internal combustion engine to reduce starting for long periods of time. Additionally, if the engine is started, it may be started for a short period of time, since a control objective of the hybrid vehicle may be to conserve hydrocarbon based fuel.

The hybrid vehicle may also include an air intake system (AIS) hydrocarbon trap in the engine's air intake system. The AIS hydrocarbon trap may lower an amount of hydrocarbons that may escape from the engine and engine air intake while the engine is stopped (e.g., not rotating and combusting fuel). However, the AIS has limited hydrocarbon storage capacity and it may be difficult to purge all or a majority of hydrocarbons from the AIS hydrocarbon trap because the engine may be stopped shortly after it is started to conserve fuel. Consequently, if the AIS hydrocarbon trap is not completely purged of hydrocarbons before the engine is stopped, there may be insufficient hydrocarbon storage capacity in the AIS hydrocarbon trap to prevent hydrocarbons from escaping the engine and AIS. Therefore, it may be desirable to provide a way of purging an AIS hydrocarbon trap of trapped fuel vapors in a short period of time.

The inventors herein have recognized the previously mentioned issues and have developed a method for an engine, comprising: anticipating starting of an engine; and activating a heater of a carbon filled fuel vapor storage canister in response to anticipating starting of the engine.

By anticipating engine starting, a heater integral to a carbon filled fuel vapor storage canister may be activated to heat air prior to the engine being started so that even if the engine is operated for a short period of time, a larger amount of fuel vapors may be combusted via the engine. For example, if a hybrid vehicle is traveling 100 kilometers to a destination that has been requested by vehicle occupants and the hybrid vehicle's traction battery has just enough charge to travel 50 kilometers, an electric heater may be activated to heat air that will eventually pass by or through the air intake system hydrocarbon trap so that hydrocarbons may be purged from the air intake system hydrocarbon trap.

The present approach provides several advantages. Specifically, the approach utilizes an existing heater to deep purge an air intake system hydrocarbon trap so that the available capacity of the air intake system hydrocarbon trap to store hydrocarbons may be raised, thereby reducing the system's financial expense. In addition, the approach may reduce emissions of hydrocarbons to the atmosphere. Further, the approach may be applied to different evaporative emissions systems.

It may be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
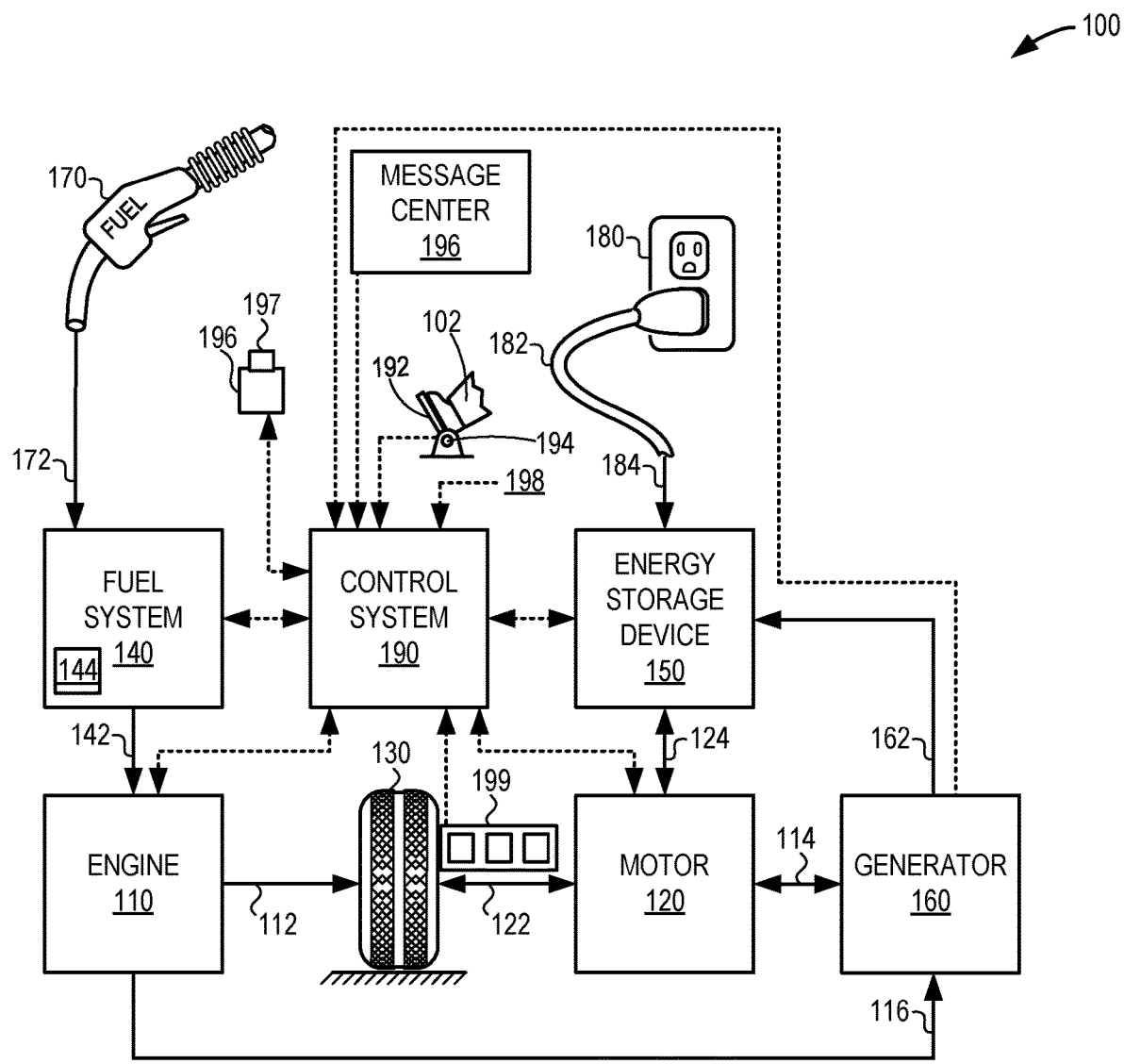
FIG. 1 shows a high-level block diagram illustrating an example vehicle system.

The following description relates to systems and methods for deep purging of hydrocarbons from an air intake system hydrocarbon trap. The air intake system may be part of a hybrid vehicle as shown in FIG. 1. The hybrid vehicle may include an evaporative emissions system as shown in either FIG. 2 or FIG. 3. Hydrocarbons may be deep purged from an air intake system as shown in the sequence of FIG. 4 according to the method of FIG. 5.

FIG. 1 illustrates an example vehicle propulsion system 100. Vehicle propulsion system 100 includes an internal combustion engine 110 and a motor 120 (e.g., an electric machine). Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state, in other words set to a deactivated state, where combustion of fuel via the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122, where the motor may convert the kinetic energy of the vehicle to electrical energy for storage at energy storage device 150 as indicated by arrow 124. This operation may be referred to as regenerative braking of the vehicle. Thus, motor 120 may provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle, such as sealed pressure-less non-integrated refueling canister-only systems (NIRCOS) fuel tanks. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of the engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal, or alternatively, a driver demand pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical energy transmission cable 182 may electrically couple energy storage device 150 and power source 180. While the vehicle propulsion system is operated to propel the vehicle, electrical energy transmission cable 182 may be disconnected between power source 180 and energy storage device 150. Control system 190 may identify and/or control the amount of electrical energy stored at the energy storage device, which may be referred to as the state of charge (SOC).

In other embodiments, electrical energy transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it may be appreciated that any suitable approach may be used for recharging energy storage device 150 from a power source that does not comprise part of the vehicle, such as from solar or wind energy. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 (e.g., human/machine interface) may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank 144 in the vehicle may be depressurized so that refueling may be performed.

Figure 2:
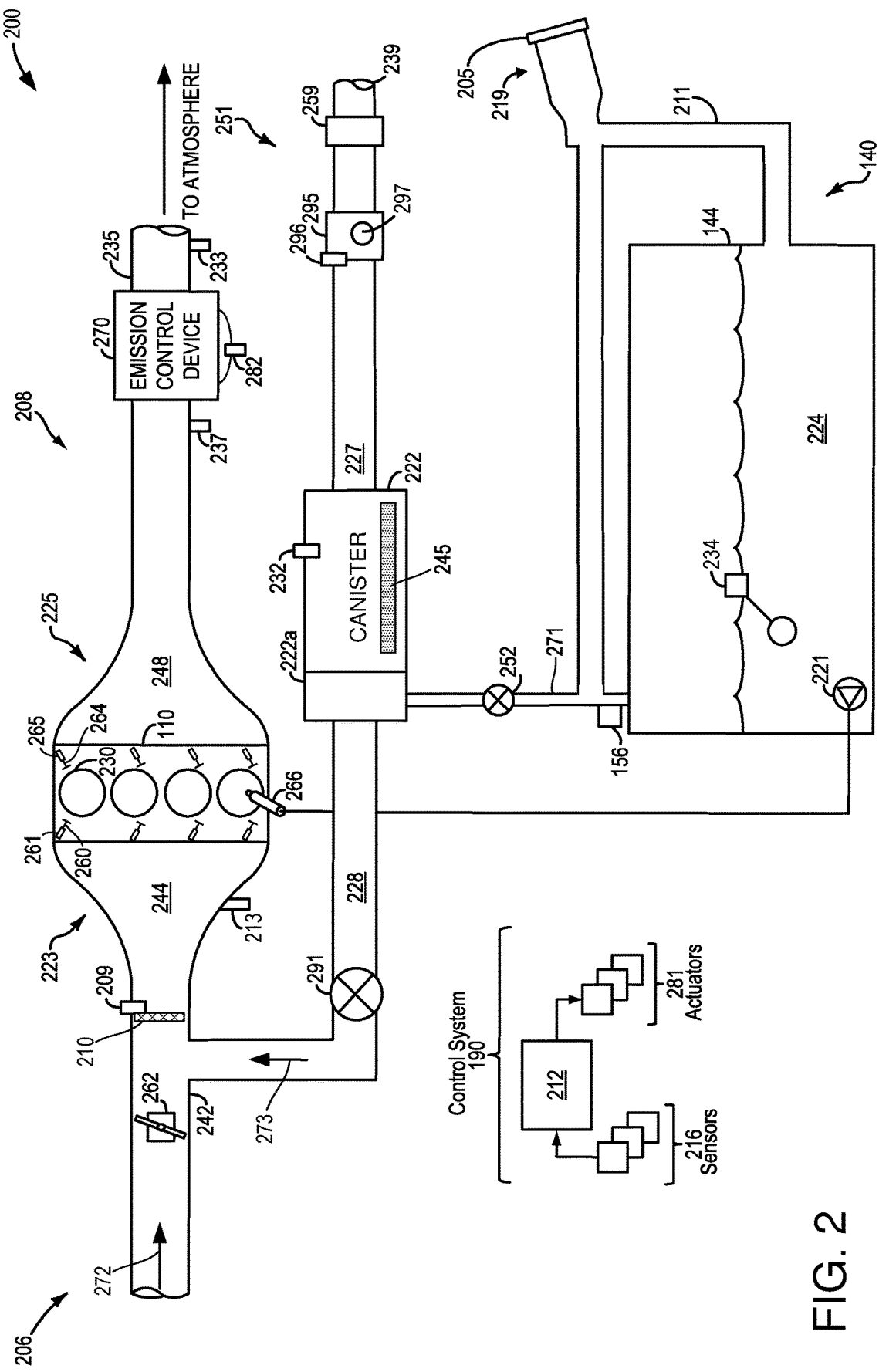
FIGS. 2 and 3 show schematic diagrams of fuel systems and evaporative emissions control (EVAP) systems that may be included in the example vehicle system of FIG. 1.

Referring now to FIG. 2, a schematic diagram 200 depicting a first vehicle system 206 is shown. In some examples, vehicle system 206 may be an HEV system, such as a PHEV system. For example, vehicle system 206 may be the same as vehicle propulsion system 100 of FIG. 1. However, in other examples, vehicle system 206 may be implemented in a non-hybrid vehicle (e.g., a vehicle equipped with an engine and without a motor operable to at least partially propel the vehicle).

Vehicle system 206 may include an engine system 208 coupled to each of an evaporative emissions control system 251 (EVAP) and fuel system 140. Engine system 208 may include engine 110 having a plurality of cylinders 230. Engine 110 may include an engine air intake system 223 and an engine exhaust system 225.

Fresh air may flow into engine 110 as indicated by arrow 272. Each cylinder may include an intake poppet valve 260 and an intake poppet valve actuator 261. Intake poppet valve actuator 261 may be electrically, mechanically, or hydraulically operated and it may hold an intake valve in an open or closed position for an entire cycle of the engine, if desired. Likewise, each cylinder may include an exhaust poppet valve 264 and an exhaust poppet valve actuator 265. Exhaust poppet valve actuator 265 may be electrically, mechanically, or hydraulically operated and it may hold an exhaust valve in an open or closed position for an entire cycle of the engine, if desired.

Engine air intake system 223 may include a throttle 262 in fluidic communication with an engine intake manifold 244 via an intake passage 242. Further, engine air intake system 223 may include an air box and filter (not shown) positioned upstream of throttle 262. Engine exhaust system 225 may include an exhaust manifold 248 leading to an exhaust passage 235 that routes exhaust gas to the atmosphere. Evaporative emissions control system 251 may supply a mixture of air and fuel, or alternatively, fresh air to engine air intake system as indicated by arrow 273. Engine air intake system 223 may include an air intake system hydrocarbon trap 210 for trapping hydrocarbons while engine 110 is not combusting fuel and air to reduce evaporative emissions. Air intake system hydrocarbon trap 210 is shown positioned downstream of throttle 262, but in other examples, air intake system hydrocarbon trap 210 may be positioned upstream of throttle 262. Evaporative emissions control system may be positioned to supply fresh air or a mixture of air and fuel to engine air intake system 223 upstream of air intake system hydrocarbon trap 210 whether air intake system hydrocarbon trap 210 is position upstream or downstream of throttle 262. Thus, evaporative emissions system may supply fresh air or a mixture of air and fuel to engine air intake system 223 upstream of air intake system hydrocarbon trap 210.

Engine exhaust system 225 may include an emission control device 270, which may include one or more exhaust catalysts. For instance, emission control device 270 may include one or more of a three-way catalyst, a lean nitrogen oxide (NOx) trap, a particulate filter, an oxidation catalyst, etc. In some examples, flow through the emission control device 270 may be sensed via a differential pressure sensor 282.

It will be appreciated that other components may be included in engine system 208 such as a variety of valves and sensors. For example, a barometric pressure sensor 213 may be included in engine air intake system 223. In one example, barometric pressure sensor 213 may be a manifold air pressure (MAP) sensor and may be coupled to engine intake manifold 244 downstream of throttle 262. Barometric pressure sensor 213 may rely on part throttle or full or wide open throttle conditions, e.g., when an opening amount of throttle 262 is greater than a threshold, in order to accurately determine a barometric pressure. Additionally, the engine system may further include an ambient temperature sensor (not shown).

Fuel system 140 may include fuel tank 144 coupled to a fuel pump system 221. Fuel pump system 221 may include one or more pumps for pressurizing fuel delivered to cylinders 230 via fuel injectors 266 during a single cycle of cylinders 230 (while only a single fuel injector 266 is shown at FIG. 2, additional fuel injectors may be provided for each cylinder 230). A distribution or relative amounts of fuel delivered, injection timing, etc. may vary with operating conditions such as engine load, engine knock, exhaust temperature, etc. responsive to different operating or degradation states of fuel system 140, engine 110, etc. A pressure in the fuel system may be estimated via a fuel tank pressure transducer (FTPT) 156. In one example, the FTPT 156 may be included within the fuel tank 144.

Fuel system 140 may be a return-less fuel system, a return fuel system, or any one of various other types of fuel system. Fuel tank 144 may hold a fuel 224 including a plurality of fuel blends, e.g., fuel with a range of alcohol mixtures, such as gasoline, various gasoline-ethanol blends (including E10, E85), etc. A fuel level sensor 234 disposed in fuel tank 144 may provide an indication of the fuel level ("Fuel Level Input") to a controller 212 included in control system 190. As depicted, fuel level sensor 234 may include a float coupled to a variable resistor. Alternatively, other types of fuel level sensors may be used.

Vapors generated in fuel system 140 may be routed to EVAP system 251 via a first conduit 271 that extends between fuel tank 144 and carbon filled fuel vapor storage canister 222. Air and/or fuel vapors stored in carbon filled fuel vapor storage canister 222 may be routed to intake manifold 244 via second conduit 228 (e.g., a passage). Third conduit 227 (e.g., a passage) extends between carbon filled fuel vapor storage canister 222 and atmospheric port 239.

A fuel tank isolation valve (FTIV) 252 for isolating the fuel tank during certain conditions is shown positioned along first conduit 271. For example, during engine operation, FTIV 252 may be kept closed to reduce the amount of diurnal or "running loss" vapors directed to carbon filled fuel vapor storage canister 222 from fuel tank 144. During refueling operations and selected purging conditions, FTIV 252 may be temporarily opened, e.g., for a duration, to direct fuel vapors from the fuel tank 144 to carbon filled fuel vapor storage canister 222. Further, FTIV 252 may also be temporarily opened when the fuel tank pressure is higher than a threshold (e.g., above a mechanical pressure limit of the fuel tank), such that fuel vapors may be released into the carbon filled fuel vapor storage canister 222 and the fuel tank pressure is maintained below the threshold.

As depicted in FIG. 2, the FTIV 252 is illustrated as being outside of the tank, though it may be appreciated that in other examples, the FTIV 252 along with sections of first conduit 271 may be contained wholly within the fuel tank 144 without departing from the scope of the present disclosure.

In some examples, refueling system 219 may include a fuel cap 205 for sealing off the refueling system from the atmosphere. Refueling system 219 may be coupled to fuel tank 144 via a fuel filler pipe 211. During refueling, fuel cap 205 may be manually opened or may be automatically opened responsive to a refueling request received at controller 212. A fuel dispensing device (e.g., shown in FIG. 1 as 170) may be received by, and thereafter fluidically coupled to, refueling system 219, whereby fuel may be supplied to fuel tank 144 via fuel filler pipe 211. Refueling may continue until the fuel dispensing device is manually shut off or until fuel tank 144 is filled to a threshold fuel level (e.g., until feedback from fuel level sensor 234 indicates the threshold fuel level has been reached), at which point a mechanical or otherwise automated stop of the fuel dispensing device may be triggered.

EVAP system 251 may include one or more emissions control devices, such as carbon filled fuel vapor storage canister 222 filled with an appropriate adsorbent, the carbon filled fuel vapor storage canister being configured to temporarily trap fuel vapors (including vaporized hydrocarbons) during refueling operations. In one example, the adsorbent used may be activated charcoal. EVAP system 251 may further include a canister ventilation path or via third conduit 227 which may route gases out of carbon filled fuel vapor storage canister 222 to the atmosphere when storing, or trapping, fuel vapors from fuel system 140. Carbon filled fuel vapor storage canister may also include an integral heater 245 (e.g., electrically powered heater) that may be activated so as to deep purge carbon filled fuel vapor storage canister 222 and/or air intake system hydrocarbon trap 210. The integral heater 245 may help to release longer chained hydrocarbons from the carbon filled fuel vapor storage canister 222. Integral heater 245 may comprise an electric heating element, such as a conductive metal, ceramic, or carbon element that may be heated electrically, such as a thermistor. In some embodiments, integral heater 245 may comprise a source of microwave energy, or may comprise a canister jacket coupled to a source of hot air or hot water. Integral heater 245 may be coupled to one or more heat exchangers that may facilitate the transfer of heat, (e.g., from hot exhaust) to the carbon filled fuel vapor storage canister 222. Integral heater 245 may be configured to heat air within the carbon filled fuel vapor storage canister 222, and/or to directly heat the adsorbent located within carbon filled fuel vapor storage canister 222. In some embodiments, integral heater 245 may be included in a heater compartment coupled to the interior or exterior of the carbon filled fuel vapor storage canister 222. In some embodiments, the carbon filled fuel vapor storage canister 222 may be coupled to one or more cooling circuits, and/or cooling fans. In this way, the carbon filled fuel vapor storage canister 222 may be selectively cooled to increase adsorption of fuel vapors (e.g., prior to a refueling event). In some examples, integral heater 245 may comprise one or more Peltier elements, which may be configured to selectively heat or cool the carbon filled fuel vapor storage canister 222.

Carbon filled fuel vapor storage canister 222 may include a buffer 222a (or buffer region), each of the carbon filled fuel vapor storage canister and the buffer including the adsorbent. As shown, a volume of buffer 222a may be smaller than (e.g., a fraction of) a volume of carbon filled fuel vapor storage canister 222. The adsorbent in buffer 222a may be the same as, or different from, the adsorbent in carbon filled fuel vapor storage canister 222 (e.g., both may include charcoal). Buffer 222a may be positioned within carbon filled fuel vapor storage canister 222 such that, during canister loading, fuel tank vapors may first be adsorbed within the buffer, and then when the buffer is saturated, further fuel tank vapors may be adsorbed in a remaining volume of the carbon filled fuel vapor storage canister. In comparison, during purging of carbon filled fuel vapor storage canister 222, fuel vapors may first be desorbed from the carbon filled fuel vapor storage canister (e.g., to a threshold amount) before being desorbed from buffer 222a. In other words, loading and unloading of buffer 222a may not be linear with loading and unloading of carbon filled fuel vapor storage canister 222. As such, one effect of buffer 222a is to dampen any fuel vapor spikes flowing from fuel tank 144 to carbon filled fuel vapor storage canister 222, thereby reducing a possibility of any fuel vapor spikes going to engine 110. After deep purging of hydrocarbons from carbon filled fuel vapor storage canister 222, air may flow from atmosphere to engine intake manifold 244.

In some examples, one or more temperature sensors 232 may be coupled to and/or within carbon filled fuel vapor storage canister 222. As fuel vapor is adsorbed by the adsorbent in carbon filled fuel vapor storage canister 222, heat may be generated (heat of adsorption). Likewise, as fuel vapor is desorbed by the adsorbent in carbon filled fuel vapor storage canister 222, heat may be consumed. In this way, the adsorption and desorption of fuel vapor by carbon filled fuel vapor storage canister 222 may be monitored and estimated based on temperature changes within the carbon filled fuel vapor storage canister. Further, a temperature sensor 209 may be included in or near air intake system hydrocarbon trap 210 to sense the temperature of the same and for estimating an amount of hydrocarbons stored in the air intake system hydrocarbon trap 210.

Third conduit 227 may also allow fresh air to be drawn into carbon filled fuel vapor storage canister 222 when purging stored fuel vapors from fuel system 140 to engine air intake system 223 via second conduit 228 and canister purge valve (CPV) 291. For example, CPV 291 may be a normally closed valve, but may be opened during certain conditions so that vacuum from engine intake manifold 244 may be provided to carbon filled fuel vapor storage canister 222 for purging. In some examples, third conduit 227 may further include an air filter 259 disposed therein downstream of carbon filled fuel vapor storage canister 222.

In some examples, EVAP system 251 may further include an evaporative level check monitor (ELCM) 295. ELCM 295 may be disposed in third conduit 227, between carbon filled fuel vapor storage canister 222 and air filter 259, and may be configured to control venting and/or assist in detection of undesired evaporative emissions. As an example, ELCM 295 may include a vacuum pump 297 for applying negative pressure to the fuel system when administering a test for undesired evaporative emissions. In some embodiments, the vacuum pump may be configured to be reversible. In other words, the vacuum pump may be configured to apply either a negative pressure or a positive pressure on the EVAP system 251 and fuel system 140. ELCM 295 may also include a changeover valve (COV) 296 to selectively allow or prevent flow through ELCM 295. For example, COV 296 may be open when carbon filled fuel vapor storage canister 222 is being purged of fuel vapors or when air intake system hydrocarbon trap 210 is being purged of hydrocarbons so that fresh air may flow to the trap and the storage canister. COV 296 may be closed when FTIV 252 is closed and fuel vapors are being stored in fuel tank 144.

Routines for detecting undesired evaporative emission may be intermittently performed by controller 212 on fuel system 140 to confirm that the fuel system is not degraded. As such, undesired evaporative emission detection routines may be performed while the engine is off (engine-off degradation test) using engine-off natural vacuum (EONV) generated due to a change in temperature and pressure at the fuel tank following engine shutdown and/or with vacuum supplemented from a vacuum pump. Alternatively, undesired evaporative emission detection routines may be performed while the engine is running by operating a vacuum pump and/or using engine intake manifold vacuum. Undesired evaporative emission tests may be performed by the ELCM 295 communicatively coupled to controller 212.

Fuel system 140 may be a non-integrated refueling canister-only system (NIRCOS), in that fuel tank 144 may be substantially isolatable from carbon filled fuel vapor storage canister 222 such that fuel vapors in fuel tank 144 and carbon filled fuel vapor storage canister 222 may be independently controlled as desired (e.g., during refueling). During periods in which fuel tank 144 is fluidically decoupled from carbon filled fuel vapor storage canister 222, a fuel vapor pressure may develop within the fuel tank. Accordingly, venting and depressurization control routines are often implemented for NIRCOS fuel tanks, along with structural reinforcement thereof. For example, a given NIR-COS may include numerous valves and venting lines coupled to fuel tank(s) included therein to ensure that any excess fuel vapor pressure is properly evacuated or redistributed. Further, NIRCOS fuel tanks may be constructed of high tensile-strength material, such as heavy steel, and configured with a plurality of standoffs therein, the plurality of standoffs extending between opposing walls of a given NIRCOS fuel tank, such that greater fuel vapor pressures may be withstood without fuel tank degradation.

Fuel system 140 may be operated by controller 212 in a plurality of modes by selective adjustment of the various valves (e.g., responsive to the various sensors). For example, fuel system 140 may be operated in a refueling mode (e.g., when refueling is requested by a vehicle operator), wherein controller 212 may close FTIV 252. Additionally, fuel system 140 may be operated in a venting mode. In the venting mode, controller 212 may open FTIV 252 and canister vent valve 229, while maintaining CPV 291 closed, to direct refueling vapors into carbon filled fuel vapor storage canister 222 while preventing fuel vapors from being directed into engine intake manifold 244 (and thus provide a venting path for fuel vapors). As such, opening FTIV 252 may allow refueling vapors to be stored in carbon filled fuel vapor storage canister 222. After refueling is completed, at least FTIV 252 may be closed once again.

As another example, the fuel system may be operated in a canister purging mode (e.g., after a given emission control device light-off temperature has been attained and with engine 110 running), wherein controller 212 may open CPV 291 and canister vent valve 229 while closing FTIV 252. Herein, the vacuum generated by engine intake manifold 244 of (operating) engine 110 may be used to draw fresh air through third conduit 227 and through carbon filled fuel vapor storage canister 222 and air intake system hydrocarbon trap to purge stored fuel vapors into engine intake manifold 244. As such, in the canister purging mode, the purged fuel vapors from carbon filled fuel vapor storage canister 222 may be combusted in engine 110. The canister purging mode may be continued until an amount or level of stored fuel vapors in carbon filled fuel vapor storage canister 222 is below a threshold amount or level.

In still another example, the fuel system may be operated in an air intake system hydrocarbon trap purging mode. In some examples, carbon filled fuel vapor storage canister may be applied exclusively to store fuel vapors during fuel tank refilling. Since the vehicle is a hybrid vehicle with relatively large traction battery charge storage capacity, the fuel tank may be refilled infrequently. Therefore, the carbon filled fuel vapor storage canister may be purged of fuel vapors, but the engine may be stopped and restarted several times between fuel tank refills. The air intake system hydrocarbon trap may store fuel vapors each time the engine is stopped due to residual fuel that may be in the engine's intake manifold and other sources of fuel vapor in the engine. However, the air intake system hydrocarbon trap may lack capacity to store hydrocarbons generated during two or more engine stop periods (e.g., where the engine is not rotating and combusting fuel). Therefore, it may be desirable to deep purge the air intake system hydrocarbon trap of trapped hydrocarbons via directing warm fresh air to the air intake system hydrocarbon trap via the carbon filled fuel vapor storage canister and atmosphere. Warm fresh air may be supplied to the air intake system hydrocarbon trap 210 and engine 110 when engine 110 is running by opening CPV 291, closing FTIV 252, and opening COV 296.

Control system 190, including controller 212, is shown receiving information from a plurality of sensors 216 (various examples of which are described herein) and sending control signals to a plurality of actuators 281 (various examples of which are described herein). Controller 212 may be configured as a powertrain control module (PCM). As one example, sensors 216 may include one or more of exhaust gas sensor 237 located upstream of emission control device 270 in exhaust passage 235, temperature sensor 233 located downstream of emission control device 270 in exhaust passage 235, fuel level sensor 234 located in fuel tank 144, temperature sensor 232 located in carbon filled fuel vapor storage canister 222, temperature sensor 209, and FTPT 156. Other sensors such as pressure, temperature, air/fuel ratio, and composition sensors may be coupled to various locations in vehicle system 206. As an additional or alternative example, actuators 281 may include fuel injector 266, throttle 262, FTIV 252, CPV 291, COV 296, and integral heater 245. Controller 212 may receive input data from sensors 216, process the input data, and trigger actuators 281 in response to the processed input data based on instructions or code programmed in non-transitory memory therein, the instructions or code corresponding to one or more control routines.

Figure 3:
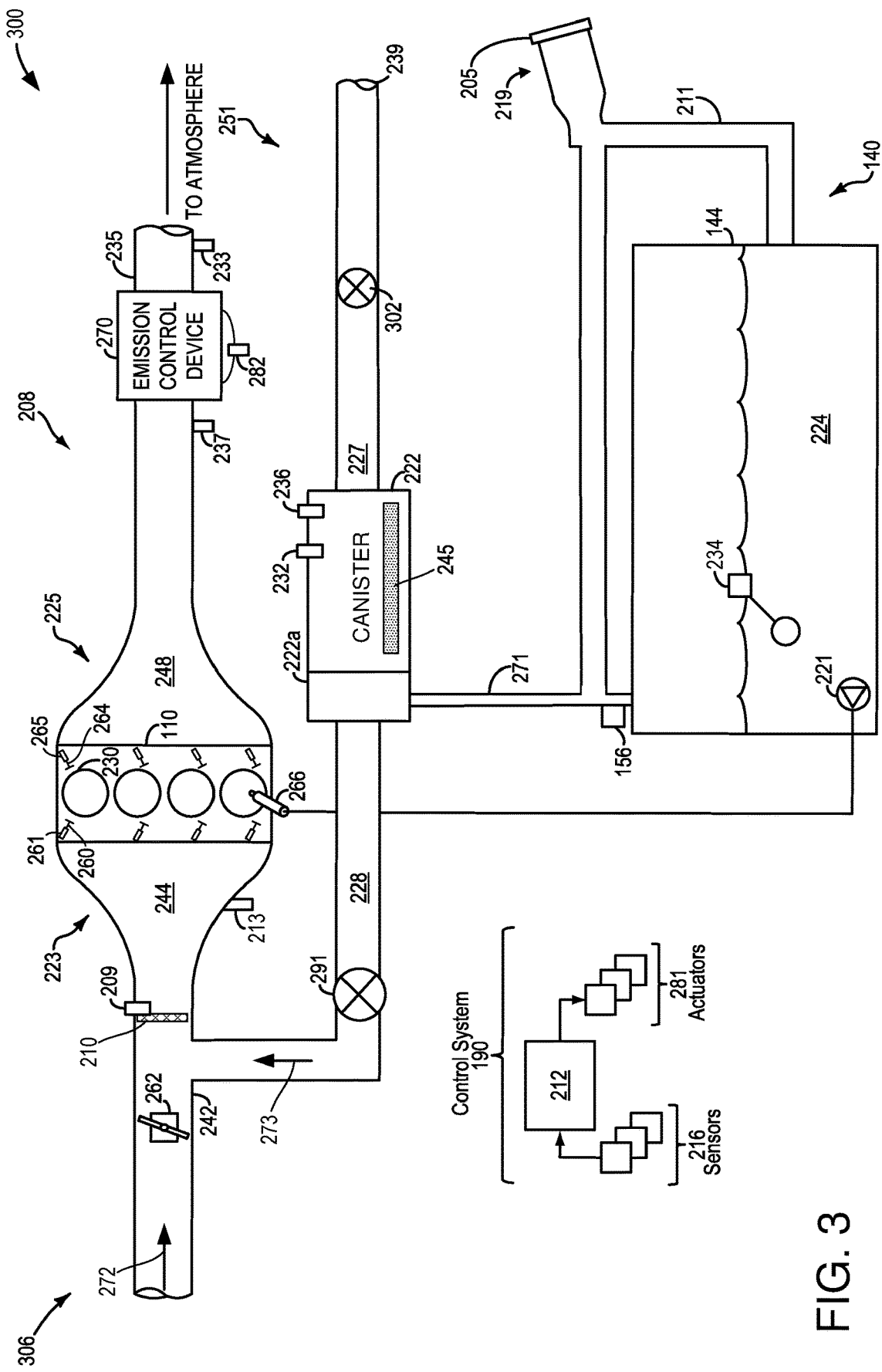
Figure 4:
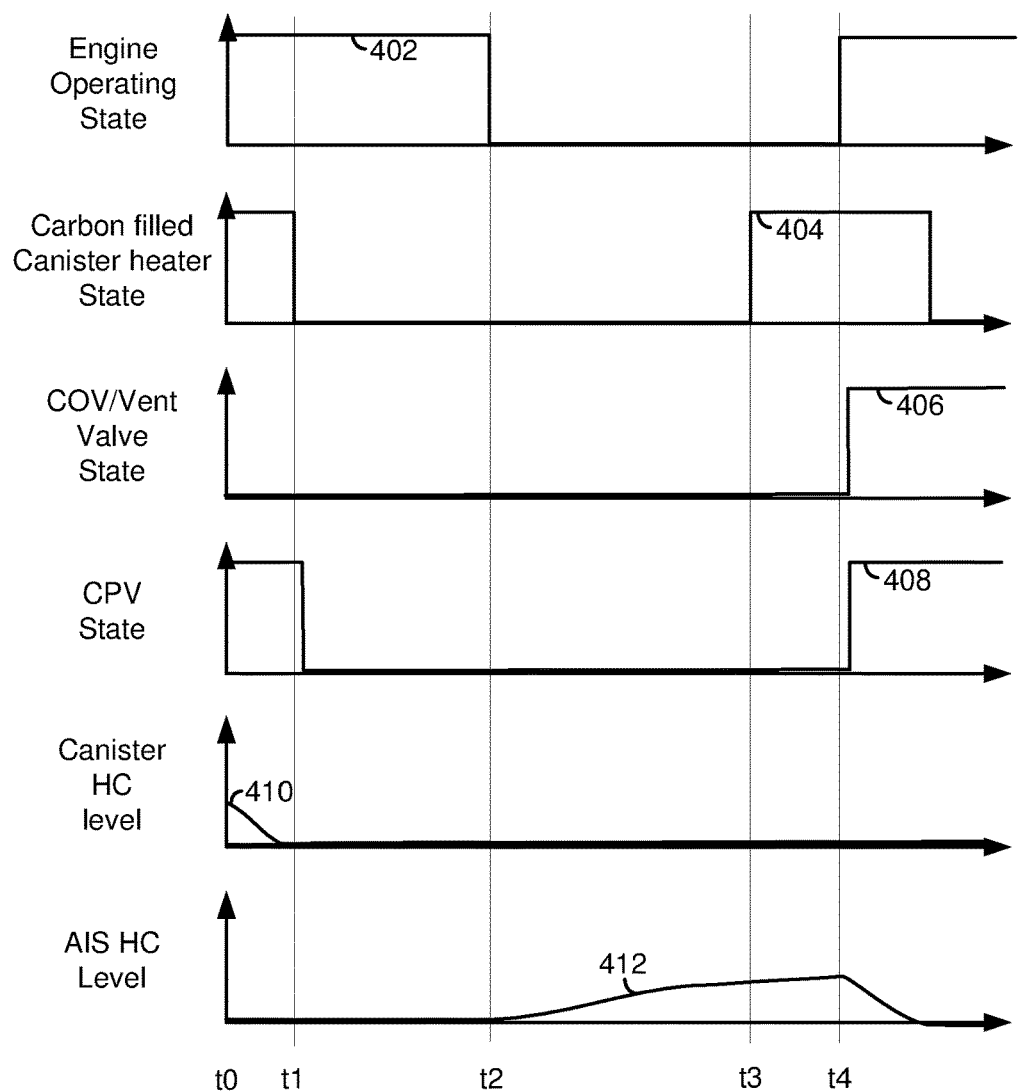
FIG. 4 shows an example operating sequence according to the system of FIGS. 1-3 and the method of FIG. 5.

Referring now to FIG. 3, a schematic diagram 300 depicting a second vehicle system 306 is shown. The second vehicle system 306 shown in FIG. 3 includes many of the same components as the first vehicle system 206 shown in FIG. 2. The components of FIG. 3 that are the same as components shown in FIG. 2 are numbered with the same numbers and these components operate as previously described unless mentioned otherwise. Therefore, for the sake of brevity, the description of each of these components is omitted. Components of FIG. 3 that are different from the components of FIG. 2 will be described.

The second system 306 includes a canister vent valve (CVV) 302 instead of an ELCM 295. CVV 302 may be opened along with CPV 291 when carbon filled fuel vapor storage canister 222 and/or air intake system hydrocarbon trap 210 are purge of hydrocarbons. Further, CVV 302 may be opened and CPV 291 closed when fuel tank 144 is filled with fuel so that fuel vapors may be stored in carbon filled fuel vapor storage canister 222.

Thus, the system of FIGS. 1 and 2 provides for a system for a vehicle, comprising: an internal combustion engine including an air intake system; a carbon filled fuel vapor storage canister including a heater; an air intake system hydrocarbon trap positioned within the air intake system; and a controller including executable instructions stored in non-transitory memory that cause the controller to activate the heater to heat air flowing through the carbon filled fuel vapor storage canister to the air intake system hydrocarbon trap. In a first example, the system includes where the heater is activated in response to anticipated starting of the internal combustion engine. In a second example that may include the first example, the system further comprises additional instructions to open a canister purge valve and a canister vent valve. In a third example that may include one or both of the first and second examples, the system further comprises additional instructions to open a canister purge valve and change over valve. In a fourth example that may include one or more of the first through third examples, the system further comprises additional instructions to purge the carbon filled fuel vapor storage canister such that the carbon filled fuel vapor is purged of hydrocarbons before activating the heater. In a fifth example that may include one or more of the first through fourth examples, the system further comprises an electric machine configured to propel the vehicle. In a sixth example that may include one or more of the first through fifth examples, the system further comprises additional executable instructions that cause the controller to activate the heater while the electric machine is propelling the vehicle. In a seventh example that may include one or more of the first through sixth examples, the system further comprises a conduit extending from the carbon filled fuel vapor storage canister to the air intake system at a position upstream of the air intake system hydrocarbon trap.

Turning now to FIG. 4, example operating sequence according to the system of FIGS. 1-3 and the method of FIG. 4 is shown. The operating sequence of FIG. 4 may be provided via the system of FIGS. 1-3 in cooperation with the method of FIG. 4. The vertical lines at times t0-t4 represent times of interest during the operating sequence. The plots are time aligned.

The first plot from the top of FIG. 4 is a plot of engine operating state versus time. The vertical axis represents engine operating state and the engine operating state indicates that the engine is on (e.g., rotating and combusting fuel) when trace 402 is a higher level that is near the vertical axis arrow. The engine operating state indicates that the engine is off (e.g., not rotating and combusting fuel) when trace 402 is at a lower level that is near the horizontal axis. The horizontal axis represents time and time increases from the left side of the plot to the right side of the plot. Trace 402 represents the engine operating state.

The second plot from the top of FIG. 4 is a plot of carbon filled fuel vapor storage canister heater state versus time. The vertical axis represents the operating state of the carbon filled fuel vapor storage canister heater state and the carbon filled fuel vapor storage canister heater is activated when trace 404 is at a high level that is near the vertical axis arrow. The carbon filled fuel vapor storage canister heater is not activated when trace 404 is near the horizontal axis. The horizontal axis represents time and time increases from the left side of the plot to the right side of the plot. Trace 404 represents the carbon filled fuel vapor storage canister heater state.

The third plot from the top of FIG. 4 is a plot of COV or CVV state versus time. The vertical axis represents COV/CVV state and the COV/CVV is open when trace 406 is near the level of the vertical axis arrow. The COV/CVV is fully closed when trace 406 is near the level of the horizontal axis. The horizontal axis represents time and time increases from the left side of the plot to the right side of the plot. Trace 406 represents the COV/CVVstate.

Figure 5:
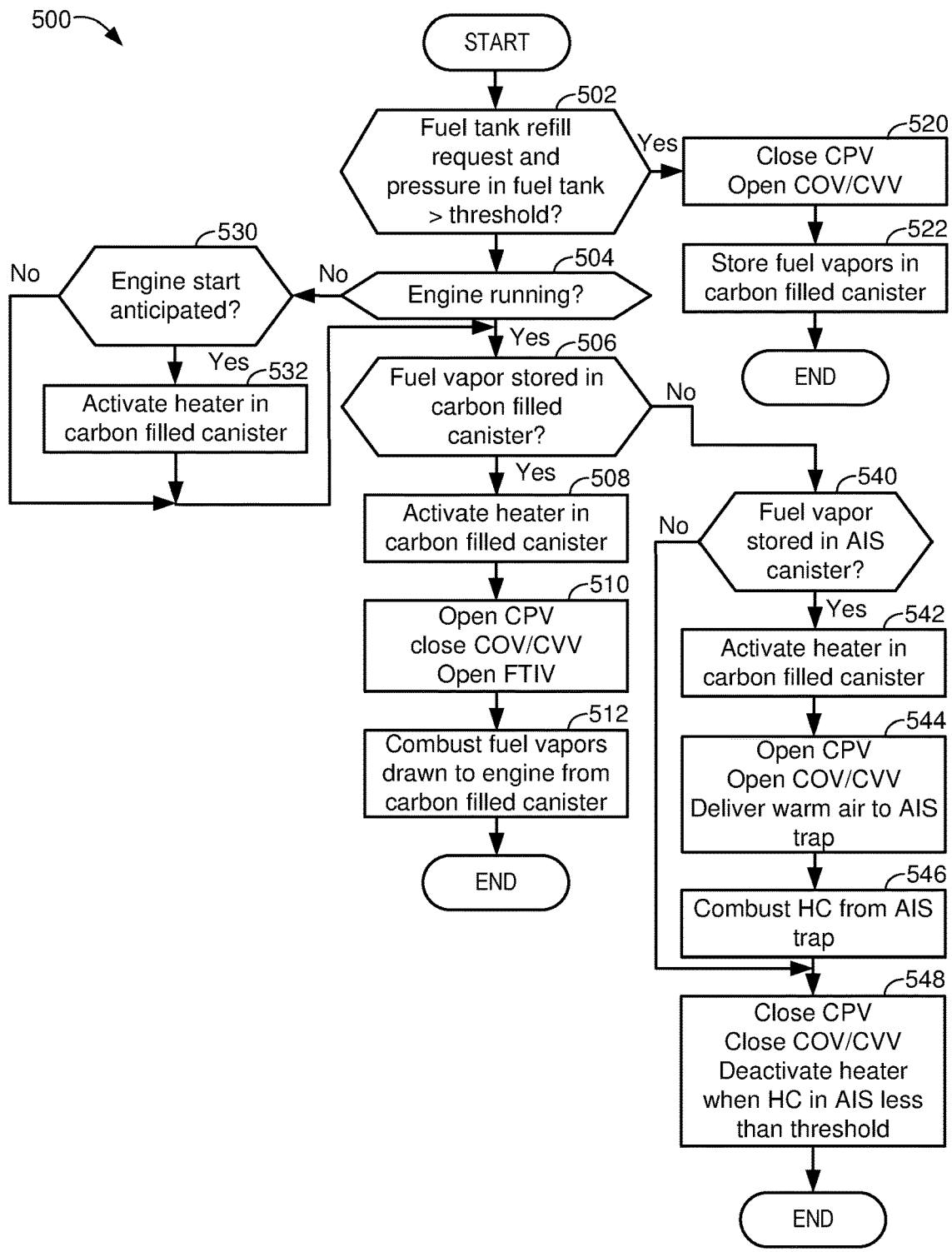
FIG. 5 shows a flow chart of an example method for operating a vehicle and its evaporative emissions system.

The fourth plot from the top of FIG. 5 is a plot of CPB state versus time. The vertical axis represents CPV and the CPV state indicates that the CPV is closed when trace 408 is near the horizontal axis. The CPV is open when trace 408 is near the vertical axis arrow. The horizontal axis represents time and time increases from the left side of the plot to the right side of the plot. Trace 408 represents the CPV state.

The fifth plot from the top of FIG. 4 is a plot of an amount of hydrocarbons (HC) stored in the carbon filled fuel vapor storage canister versus time. The vertical axis represents an amount of HC stored in the carbon filled fuel vapor storage canister and the amount of hydrocarbons increases in the direction of the vertical axis arrow. The horizontal axis represents time and time increases from the left side of the plot to the right side of the plot. Trace 410 represents the amount of hydrocarbons that are stored in the carbon filled fuel vapor storage canister.

The sixth plot from the top of FIG. 4 is a plot of an amount of hydrocarbons (HC) stored in the air intake system (AIS) hydrocarbon trap versus time. The vertical axis represents an amount of HC stored in the air intake system hydrocarbon trap and the amount of hydrocarbons increases in the direction of the vertical axis arrow. The horizontal axis represents time and time increases from the left side of the plot to the right side of the plot. Trace 412 represents the amount of hydrocarbons that are stored in the air intake system hydrocarbon trap.

At time t0, the engine is operating and the carbon filled fuel vapor storage canister heater is activated to deep purge the carbon filled fuel vapor storage canister. Fuel vapors from the canister are combusted in the engine. The COV/CVV is fully closed and the CPV is open to allow fuel vapors to enter the engine from the carbon filled fuel vapor storage canister. The amount of hydrocarbons stored in the carbon filled fuel vapor storage canister is being lowered. The amount of hydrocarbons stored in the air intake system hydrocarbon trap is low.

At time t1, the engine continues to operate and the carbon filled fuel vapor storage canister heater is deactivated to conserve energy since the amount of hydrocarbons stored in the carbon filled fuel vapor storage canister is low. The COV/CVV remains closed and the CPV closes shortly after the carbon filled fuel vapor storage canister heater is deactivated. The amount of hydrocarbons stored in the air intake system hydrocarbon trap remains low.

At time t2, the engine is stopped in response to vehicle operating conditions and the carbon filled fuel vapor storage canister heater remains deactivated. The COV/CVV remains fully closed and the CPV is fully closed shortly thereafter. The amount of hydrocarbons stored in the carbon filled fuel vapor storage canister is near zero and the amount of hydrocarbons stored in the air intake system hydrocarbon trap is near zero.

Between time t2 and time t3, the engine remains off and the carbon filled fuel vapor storage canister heater remains off. The COV/CVV remains fully closed and the CPV remains fully closed. The amount of hydrocarbons stored in the air intake system hydrocarbon trap begins to increase as fuel from the engine's intake manifold and cylinders is stored in the hydrocarbon trap.

At time t3, the carbon filled fuel vapor storage canister heater is activated in response to an anticipated engine start. The engine start may be anticipated based on state of charge (SOC) of the battery and distance to destination. By activating the carbon filled fuel vapor storage canister heater, air in the carbon filled fuel vapor storage canister may be heated for deep purging of the air intake system hydrocarbon trap. The COV/CVV and CPV remain fully closed. The amount of carbon stored in the carbon filled fuel vapor storage canister remains low and the amount of hydrocarbons stored in the air intake system hydrocarbon trap continues to increase.

At time t4, the engine is started and the carbon filled fuel vapor storage canister heater remains activated. Shortly after the engine is started, the COV/CVV and CPV are opened to allow heated air from the carbon filled fuel vapor storage canister to pass by and/or through the air intake system hydrocarbon trap, which causes hydrocarbons to be liberated from the trap and combusted in the engine. Thus, the amount of hydrocarbons stored in the air intake system hydrocarbon trap decreases and since the air passing through or by the air intake hydrocarbon trap is warm, the hydrocarbons are released from the air intake system hydrocarbon trap at a higher rate as compared to if the air were not heated.

In this way, a heater in a carbon filled fuel vapor storage canister may be activated to deep purge an air intake system hydrocarbon trap of fuel vapors. The heated air may cause the hydrocarbon trap to release hydrocarbons at a faster rate and in a larger amount as compared to if air passing the hydrocarbon trap is not heated.

Referring now to FIG. 5, a high-level flow chart for an example method 500 for operating an EVAP system is shown. The method 500 may be at least partially implemented as executable instructions stored in non-transitory memory of a controller in a system such as that shown in FIGS. 1-3. Further, the method of FIG. 5 may include actions taken in the physical world to transform operating states of a system, such as the system of FIGS. 1-3. Further still, method 500 may be performed in cooperation with the system shown in FIGS. 1-3. The method of FIG. 5 may also provide at least portions of the operating sequence shown in FIG. 4.

At 502, judges whether or not there is a request to refill the fuel tank and if a pressure in the fuel tank is greater than a threshold pressure. If so, the answer is yes and method 500 proceeds to 520. Otherwise, the answer is no and method 500 proceeds to 504. In one example, a user may press a button to indicate that refueling is requested and to open a fuel access door and reduce pressure in a fuel tank. Pressure may build in the fuel tank due to diurnal heating of fuel.

At 520, method 500 closes the CPV and opens the COV/CVV. Further, if the vehicle includes a FTIV, the FTIV is opened. This allows fuel vapors to flow from the fuel tank to the carbon filled fuel vapor storage canister where the fuel vapors may be stored. Method 500 proceeds to 522.

At 522, method 500 stores hydrocarbons that result from filling the fuel tank in the carbon filled fuel vapor storage canister. Once the fuel refilling ends, the COV/CVV, CPV, and FTIV are fully closed. Method 500 proceeds to exit.

At 504, method 500 judges whether or not the engine is running (e.g., rotating and combusting fuel). If so, the answer is yes and method 500 proceeds to 506. Otherwise, the answer is no and method 500 proceeds to 530.

At 530, method 500 judges whether or not engine starting is anticipated to occur within a threshold amount of time (e.g., within 15 minutes). In one example, method 500 may anticipate that an engine will or is expected to start based on a distance to the vehicle's destination and state of traction battery charge. If an amount of charge stored in the traction battery is less than an amount of charge the vehicle is expected to consume to reach the vehicle's destination, then method 500 may anticipate that the vehicle's engine will be started during the vehicle's present trip. Method 500 may estimate when the engine will be started based on attributes of a route that the vehicle is traveling (e.g., road grade, etc.) and electric charge consumption to travel the route. Method 500 may forecast engine starting for a predetermined time period into the future (e.g., 15 minutes). If method 500 judges that the engine is expected to start within a predetermined amount of time, the answer is yes and method 500 proceeds to 532. Otherwise, the answer is no and method 500 proceeds to 506.

At 532, method 500 activates a heater in the carbon filled fuel vapor storage canister. The heater is activated to warm air in and passing through the carbon filled fuel vapor storage canister. Thus, method 500 may preheat air in the carbon filled fuel vapor storage canister so that when the engine is started, warm air may be delivered to the engine without an additional waiting period so that the hydrocarbon trap may be purged sooner, which may be desirable for engines that are started infrequently so that the trap may be fully emptied sooner. Method 500 proceeds to 506.

At 506, method 500 judges whether or not there is fuel vapor stored in the carbon filled fuel vapor storage canister. Fuel vapors may be stored in the carbon filled fuel vapor storage canister from a prior filling of the fuel tank. If method 500 judges that there is fuel vapor stored in the carbon filled fuel vapor storage canister, the answer is yes and method 500 proceeds to 508. Otherwise, the answer is no and method 500 proceeds to 540.

At 508, method 500 activates the heater in the carbon filled fuel vapor storage canister to facilitate liberation of fuel vapors from the carbon. Method 500 proceeds to 510.

At 510, method 500 opens the CPV from a fully closed state, closes the COV/CVV, and opens the FTIV if present. By opening the CPV, FTIV, and closing the COV/CVV, fuel vapors from the carbon filled fuel vapor storage canister and the fuel tank may be drawn into the engine. Method 500 proceeds to 512.

At 512, method 500 combusts fuel vapors drawn from the engine from the carbon filled fuel vapor storage canister. Method 500 proceeds to exit.

At 540, method 500 judges whether or not there are more than a threshold amount of fuel vapors stored in the air intake system hydrocarbon trap. In one example, method 500 may estimate the amount of fuel vapor stored in the air intake system hydrocarbon trap based on engine temperature, ambient air temperature, engine fuel puddle model output, and other engine operating conditions. If method 500 judges that more than the threshold amount of fuel vapor is stored in the air intake system hydrocarbon trap, the answer is yes and method 500 proceeds to 542. Otherwise, the answer is no and method 500 proceeds to 548.

At 542, method 500 activates the heater in the carbon filled fuel vapor storage canister to facilitate liberation of fuel vapors from the carbon. Method 500 proceeds to 544.

At 544, method 500 opens the CPV and opens the COV/CVV. The FTIV is fully closed if present. By opening the CPV and the COV/CVV, air may be drawn from atmosphere, heated and sent to the air intake system hydrocarbon trap to facilitate the release of fuel vapors from the air intake system hydrocarbon trap so that a heater need not be provided in the engine air intake system. Since the engine air intake manifold pressure may be lower than atmospheric pressure, air may be drawn into the engine intake manifold. Method 500 proceeds to 546.

At 546, method 500 combusts fuel vapors released from the air intake system hydrocarbon trap. Method 500 proceeds to 548.

At 548, method 500 closes the CPV, closes the COV/CVV, deactivates the heater in the carbon filled fuel vapor storage canister when the amount of hydrocarbons stored in the air intake system hydrocarbon trap is less than a threshold amount or when the flow of hydrocarbons from the trap is less than a threshold amount. The amount of hydrocarbons flowing from the trap may be determined via a hydrocarbon sensor and the amount of hydrocarbons stored in the hydrocarbon trap may be estimated via a model and vehicle operating conditions. Method 500 proceeds to exit.

Thus, the method of FIG. 5 provides for a method for an engine, comprising: anticipating starting of an engine; and activating a heater of a carbon filled fuel vapor storage canister in response to anticipating starting of the engine. In a first example, the method further comprises propelling the vehicle via an electric machine while anticipating starting of the engine. In a second example that may include the first example, the method further comprises estimating an amount of hydrocarbons stored in an air intake system hydrocarbon trap exceeds a first threshold amount of hydrocarbons. In a third example that may include one or both of the first and second examples, the method further comprises purging hydrocarbons stored in the carbon filled fuel vapor storage canister prior to activating the heater such that less than a second threshold amount of hydrocarbons is stored in the carbon filled fuel vapor storage canister. In a fourth example that may include one or more of the first through third examples, the method further comprises supplying heated air to the air intake system hydrocarbon trap via flowing air through the carbon filled fuel vapor storage canister. In a fifth example that may include one or more of the first through fourth examples, the method includes wherein the heated air is supplied upstream of the air intake system hydrocarbon trap. In a sixth example that may include one or more of the first through fifth examples, the method further comprises opening a canister purge valve to flow air through the carbon filled fuel vapor storage canister and past the air intake system hydrocarbon trap.

The method of FIG. 5 also provides for a method for an engine, comprising: flowing heated air from a carbon filled fuel vapor storage canister to an air intake system hydrocarbon trap, where the air is heated via a heater installed in the carbon filled fuel vapor storage canister. In a first example, the method further comprises opening a canister purge valve and a canister vent valve to flow heated air from the carbon filled fuel vapor storage canister. In a second example that may include the first example, the method further comprises flowing heated air from the carbon filled fuel vapor storage canister in response to the engine starting. In a third example that may include one or both of the first and second examples, the method includes where the heater is activated before the engine starting when the engine is not rotating. In a fourth example that may include one or more of the first through third examples, the method further comprises combusting hydrocarbons released from the air intake system hydrocarbon trap while flowing heated air from the carbon filled fuel vapor storage canister.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims may be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
anticipating starting of the engine; activating a heater of a carbon filled fuel vapor storage canister in response to anticipating starting of the engine;
estimating an amount of hydrocarbons stored in an air intake system hydrocarbon trap exceeds a first threshold amount of hydrocarbons; and
purging hydrocarbons stored in the carbon filled fuel vapor storage canister prior to activating the heater such that less than a second threshold amount of hydrocarbons is stored in the carbon filled fuel vapor storage canister.

2. The method of claim 1, further comprising propelling a vehicle via an electric machine while anticipating starting of the engine.

3. The method of claim 1, further comprising supplying heated air to the air intake system hydrocarbon trap via flowing air through the carbon filled fuel vapor storage canister.

4. The method of claim 3, wherein the heated air is supplied upstream of the air intake system hydrocarbon trap.

5. The method of claim 4, further comprising opening a canister purge valve to flow air through the carbon filled fuel vapor storage canister and past the air intake system hydrocarbon trap.

6. A system for a vehicle, comprising:
an internal combustion engine including an air intake system;
a carbon filled fuel vapor storage canister including a heater;
an air intake system hydrocarbon trap positioned within the air intake system; and a controller including executable instructions stored in non-transitory memory that cause the controller to activate the heater to heat air flowing through the carbon filled fuel vapor storage canister to the air intake system hydrocarbon trap and purge the carbon filled fuel vapor storage canister such that carbon filled fuel vapor storage canister is purged of hydrocarbons before activating the heater.

7. The system of claim 6, where the heater is activated in response to anticipated starting of the internal combustion engine.

8. The system of claim 7, further comprising additional instructions to open a canister purge valve and a canister vent valve.

9. The system of claim 7, further comprising additional instructions to open a canister purge valve and change over valve.

10. The system of claim 6, further comprising an electric machine configured to propel the vehicle.

11. The system of claim 10, further comprising additional executable instructions that cause the controller to activate the heater while the electric machine is propelling the vehicle.

12. The system of claim 11, further comprising a conduit extending from the carbon filled fuel vapor storage canister to the air intake system at a position upstream of the air intake system hydrocarbon trap.

13. A method for an engine, comprising:
flowing heated air from a carbon filled fuel vapor storage canister to an air intake system hydrocarbon trap, where the heated air is heated via a heater installed in the carbon filled fuel vapor storage canister, where the heater is activated before the engine starting when the engine is not rotating.

14. The method of claim 13, further comprising opening a canister purge valve and a canister vent valve to flow heated air from the carbon filled fuel vapor storage canister.

15. The method of claim 14, further comprising flowing heated air from the carbon filled fuel vapor storage canister in response to the engine starting.

16. The method of claim 13, further comprising combusting hydrocarbons released from the air intake system hydrocarbon trap while flowing heated air from the carbon filled fuel vapor storage canister.

* * * * *